Figure 1:
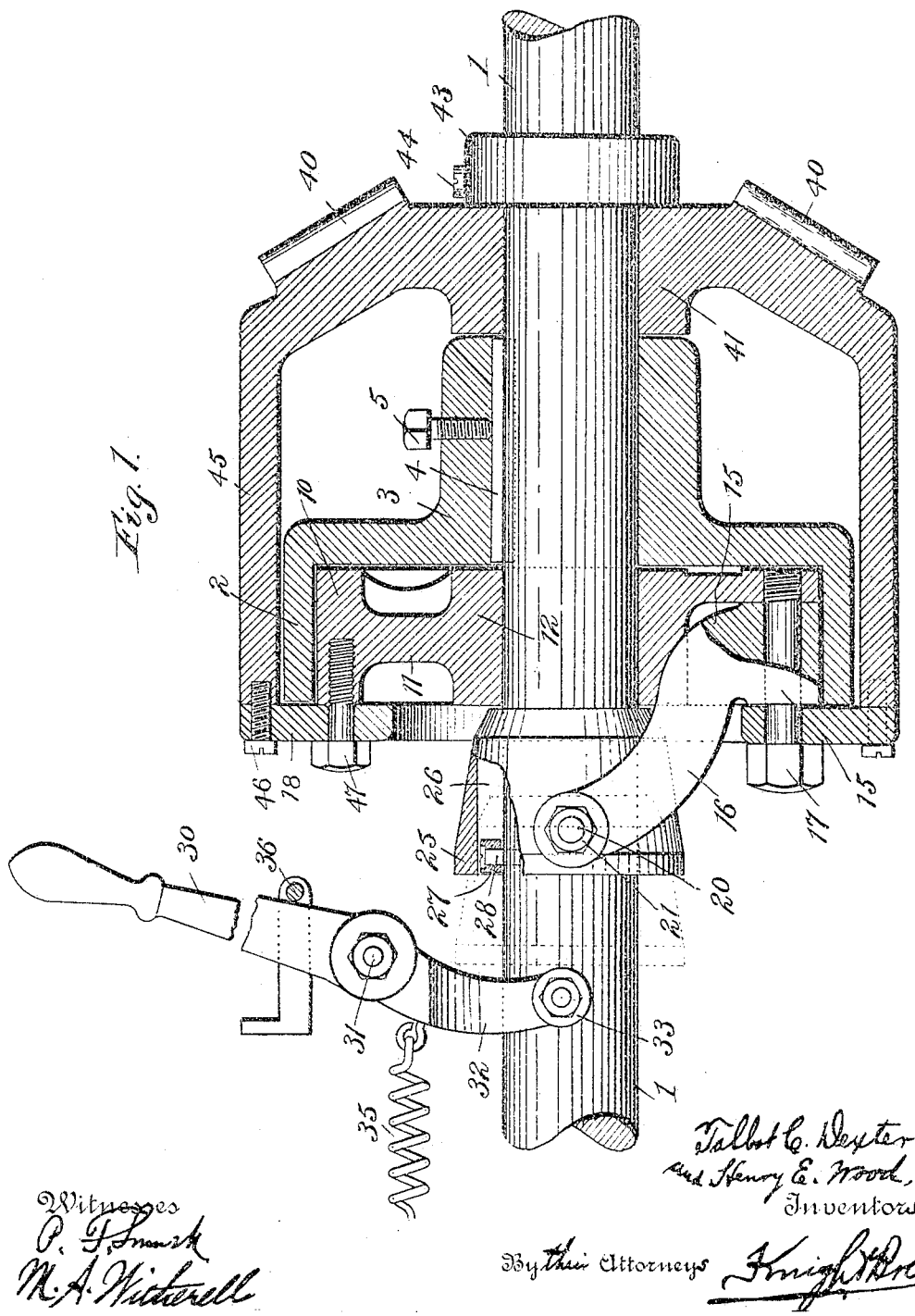

No. 775,063. PATENTED NOV. 15, 1904.
T. C. DEXTER & H. E. WOOD.
AUTOMATIC CLUTCH.
APPLICATION FILED NOV. 10, 1903.
NO MODEL. 2 SHEETS—SHEET 1.

No. 775,063.
Patented November 15, 1904.

UNITED STATES PATENT OFFICE.

TALBOT C. DEXTER AND HENRY E. WOOD, OF PEARL RIVER, NEW YORK; SAID WOOD ASSIGNOR TO SAID DEXTER.

AUTOMATIC CLUTCH.

SPECIFICATION forming part of Letters Patent No. 775,063, dated November 15, 1904.

Application filed November 10, 1903. Serial No. 180,512. (No model.)

*To all whom it may concern:*

Be it known that we, TALBOT C. DEXTER and HENRY E. WOOD, both citizens of the United States, residing at Pearl River, in the county of Rockland and State of New York, have invented certain new and useful Improvements in Automatic Clutches, of which the following is a specification.

The object of our invention is to provide a simple form of frictional clutch which is adapted to be thrown into clutched position at the will of the operator and remain in clutched position with the driven member locked to the driving member until a certain predetermined pressure or resistance is encountered and then automatically disengage or release itself to disconnect the driven member from the driving member. Such automatically-released clutches are useful in connection with many kinds of machines, but are particularly useful and were primarily designed by us as a part of an automatic paper-cutting machine, such as set forth in the pending application of Talbot C. Dexter, serially numbered 108,348, filed May 21, 1902. In this paper-cutting machine of the said Dexter application the arrangement is such that the paper-holding clamp will be automatically moved into engagement with the pile of sheets to be cut and the pressure of the clamp upon the pile increased until it reaches the maximum pressure which the clutch included in the clamp-operating mechanism is adjusted to hold, at which point the clutch is automatically disengaged to disconnect the paper-holding clamp from the operating mechanism to relieve the machine of the strain and waste of power which would result if the clamp were continuously operated upon by the operating mechanism throughout the entire cutting operation. In said pending application of Dexter an ordinary friction-clutch is controlled by a speed-governor which automatically disconnects it when the clamp engages the pile with the required pressure. With the use of the improved automatic clutch set forth in the present application the same results can be obtained without the necessity of employing the speed-governor of said Dexter application.

With the above-stated object in view our improved clutch comprises, preferably, a driving member in the form of a friction wheel or pulley securely keyed to a driving-shaft, a driven member in the form of an expansible frictional clutch-ring freely journaled upon the driving-shaft and secured, through suitable means, with an element which is adapted to be geared or mechanically connected with a part of the mechanism to be driven, a clutch-operating device in the form of a pivotally-mounted arm or lever supported upon the driven member of the clutch in proper relation to the expansible split ring to expand it into frictional engagement with the driving member, and an actuating-spool suitably splined upon the driving-shaft, so as to rotate therewith and move longitudinally thereon, and adapted to be forced into engagement with the operating-lever for actuating the clutch. Any suitable manually-operated device may be employed for forcing the spool longitudinally into engagement with the clutch-actuating lever, said spool-operating device being so arranged that it will automatically return into disengaged position to allow the spool to automatically move outwardly to disengage the clutch when it is automatically actuated.

We have discovered that with a frictional clutch, such as is above briefly described, the clutch-actuating spool will remain in clutched position so long as the split-ring-actuating lever which is engaged by the spool travels at the same rate of speed with the spool, the frictional engagement of a part of the lever with the spool being sufficient to hold the parts in clutched position. We have also discovered that the instant there is any relative movement between the actuating-spool and the clutch-lever, as when a slip occurs between the driving and driven clutch members, the spool will be automatically thrown outwardly upon the driving-shaft by reason of the relative movement of the part of the lever and the inclined surface of the actuating-spool, so that it is only necessary in producing an automatically-releasing friction-clutch to cause the spool to rotate with the driving member and allow it to be free to move into disengaged position under the automatic action just described.

In order that our invention may be fully understood, we will first describe the same with reference to the accompanying drawings and afterward point out the novelty more particularly in the annexed claims.

Figure 2:
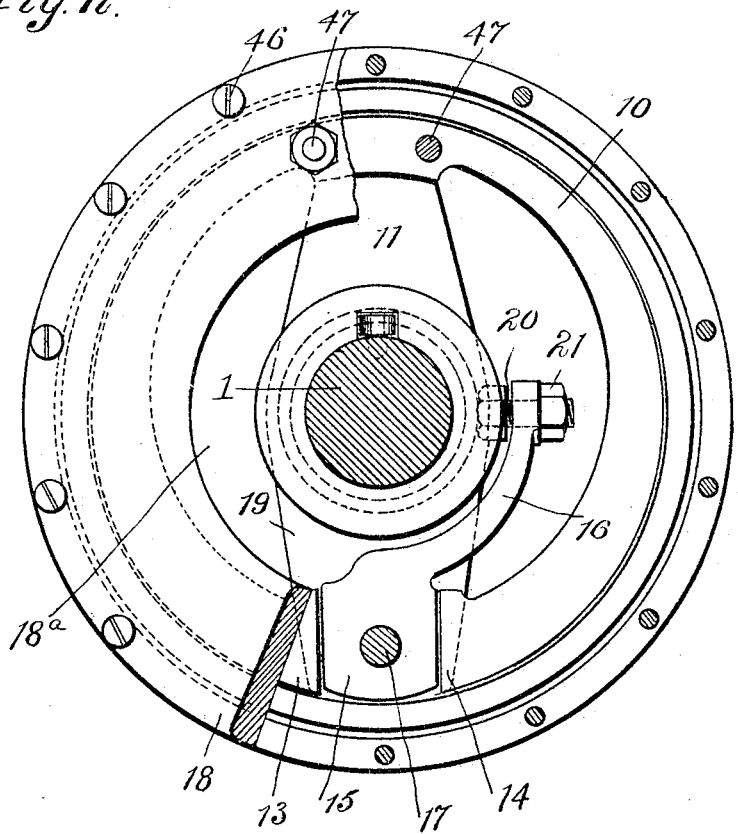

In said drawings, Figure 1 is a longitudinal sectional view of a friction-clutch embodying our invention. Fig. 2 is an end view of the same, having parts broken away and parts omitted for the sake of clearness.

1 is a driving-shaft adapted to be rotated from any suitable source of power, such as by gearing with the power-shaft of a machine to which the improved clutch is applied.

2 is a friction rim or wheel formed integral with a supporting-hub 3, which is adjustably keyed to the supporting and driving shaft 1 by means of a removable key 4, inserted in corresponding longitudinal grooves or recesses formed in the hub 3 and shaft 1, and a set-screw 5, threaded through the hub 3 and engaging the removable key 4. The rim or wheel 2 may be provided on its inner clutching-face with a covering of any suitable frictional material to produce an effective clutching-surface. The member 2 3, mounted upon the shaft 1, constitutes the driving member of our improved automatic clutch.

10 is an expansible split ring or band supported by means of the integral spoke 11 and hub 12, the latter of which is loosely journaled upon the driving-shaft 1. The split ring or band 10 rests within the frictional driving-rim 2 and is of such size relatively thereto that it will be entirely free from the driving-rim 2 when the clutch is in disengaged position. The expansible ring 10 has two oppositely-arranged expansion ends 13 and 14, formed with parallel faces, between which rests the actuating fulcrum-block 15 of the actuating-lever 16. The lever 16 is journaled upon a bolt 17, which is supported at its outer end in the circular plate or flat ring 18 (hereinafter referred to) and at its inner end in the web or spoke 19, formed integral with and extending from the hub 12 diametrically opposite to spoke 11. By rocking the lever 16 outwardly upon its fulcrum the fulcrum or block portion 15 of the lever engages the faces of the expansion ends 13 and 14 of the split ring 10 to cause it to expand and frictionally engage the interior surface of the rim 2. The lever 16 is curved in two directions from its fulcrum 17—that is, transversely and longitudinally with relation to shaft 1—to bring its free end beyond the circular plate or ring 18 of the clutch and to one side of the supporting-shaft 1 in position to be engaged by the cone face of the actuating-spool 25, hereinafter referred to. The free end of the lever 16 carries an adjustable headed bolt 20, which is threaded through the end of lever 16 and is clamped in the desired adjusted position by means of a clamp-nut 21, mounted upon its outer end. The head of the bolt 20 is adapted to be engaged by the clutch-actuating spool, which will now be described.

25 is the clutch-actuating spool. The spool 25 is tapered from its inner toward its outer edge to form an inclined surface to engage the bolt 20, carried by the free end of the clutch-actuating lever 16 to wedge the lever into clutched position. The spool 25 is formed with an internal longitudinally-extending spline-groove 26, in which engages the antifriction-roller spline 27, freely journaled upon a set-screw 28, threaded into the shaft 1. By means of the roller 27 and spline-groove 26 it will be observed that the clutch-actuating spool 25 will be caused to rotate with the shaft 1 and driving-clutch member 2, but will at the same time be free to move longitudinally upon the shaft toward and away from the clutch-actuating lever 16.

30 is a manually-operated lever journaled at 31 upon any suitable part of the machine-frame (not shown) and formed with a yoke-shaped lower end 32, in the two arms of which are journaled the antifriction-rollers 33, which are presented upon opposite sides of the shaft 1 in position to engage the vertical face of the large end of the spool 25 and move the spool inwardly into engagement with the lever 16. This operating-lever 30 is engaged by a spring 35, which holds it normally in disengaged position with its upper end against a suitable stop, such as 36, so that when the lever 30 is operated for moving the spool 25 inwardly it will as soon as released be returned to its normal disengaged position.

To utilize the expansible friction-ring 10 as the driven member of a mechanism to which our improved clutch is applied, we provide a bevel driven gear 40, which is connected with ring 10 to rotate with it. This gear 40 is formed integral with a supporting-hub 41, which is freely journaled upon the shaft 1 adjacent to the hub 3 of driving member 2, and is confined against longitudinal movement upon the shaft by means of a collar 43, secured to the shaft by a set-screw 44. This bevel-gear 40 and hub 41 are also formed integral with a cylindrical drum 45, which completely surrounds and incloses the driving member 2 of the clutch. Secured to the open end of the drum 45 is a circular plate or flat ring 18, attached to the drum 45 by set-screws 46 and formed with a central opening $18^a$ to allow the lever 16 to project outwardly from the expansible ring 10 into proper position to be engaged by the actuating-spool. The ring 18 also connects the split ring 10 with the drum 45 and gear 40 by means of set-screws 47 passing through the ring 18 into the central portion of ring 10—that is, into the portion adjacent to the connection between ring 10 and spoke 11. The ring 18 is also connected with the driven member of the clutch through the bolt 17, which passes through the ring into the web-shaped spoke 19, which projects from the hub 12.

It will be observed by the described construction for connecting up the bevel-gear 40 with the driven member of the clutch that the gear 40, drum 45, ring 18, expansible split ring 10 upon its hub 12, and the actuating-lever 16 will rotate as a single integral structure. It will also be observed that the actuating-spool 25 will rotate with the driving member 2 of the clutch.

The operation will be clear with but a few words of explanation. The shaft 1 being positively driven will cause the driving-rim 2 and spool 25 to constantly rotate with it. The connected gear 40, drum 45, expansible clutch-ring 10, and actuating-lever 16 remain at rest when the clutch is disengaged. To actuate the clutch, the manually-operated lever 30 is moved for shifting the rotating spool 25 inwardly into engagement with the bolt carried in the free end of the clutch-actuating lever 16, which action will expand the split ring 10 and cause it to frictionally engage the interior surface of the constantly-driven clutch-rim 2, with the result that the driven clutch member or split ring 10, together with lever 16, drum 45, and gear 40, will be caused to rotate with the driving member 2. While the clutch is in engaged position, the lever 16 and spool 25 are rotating together at the same rate of speed, and since the spool is securely wedged beneath the free edge of the lever the friction will be sufficient to hold these parts in engaged position, so that the clutch will continue to operate so long as the resistance exerted through the gear 40 to the machine driven is not sufficient to overcome the frictional grip between the two clutch members. If for any reason the resistance to the rotating gear 40 is sufficient to cause a slip between the driving and driven clutch members, this will obviously cause a relative movement between the engaged end of lever 16 and the inclined surface of the actuating-spool 25, and the result of this relative movement will be the automatic throwout of the clutch, the spool being forced backwardly into the position shown in dotted lines in Fig. 1, and thereby relieving the lever 16 to free the expansible split ring of the driven clutch member and disengaging the clutch.

As stated above, we may employ our improved clutch for any suitable purpose, but design it especially for use in the automatic paper-cutting machine set forth in the Dexter application, serially numbered 108,348. In this application of the invention the clutch will be automatically disengaged when the paper-holding clamp engages the pile with the required pressure, the automatic release of the clutch disengaging the clamp from its operating means to relieve the machine of the strain and loss of power which would result from a continuous slip connection between the clamp and its operating means.

We desire to claim, broadly, a clutch constructed and arranged to automatically disengage itself by the relative movement of two of its coöperating parts caused by retarding or stopping the driven member.

We are not aware that it has ever been proposed to provide a clutch of the type described in which the friction-rim is employed as the driving member and in which the lever-actuating spool is caused to rotate with the driving member, so as to insure relative movement between the spool and actuating-lever when the driven member is retarded or stopped and utilizing such relative movement for automatically moving the actuating-spool into its inactive position to disconnect the clutch. This novel form of clutch involves essentially manually-operating means which will automatically free the spool after the spool is moved into active position or operating means which will not interfere with the automatic disengaging movement of the spool, so as to leave the spool free to be automatically disengaged by the action of the clutch.

Having thus described our invention, the following is what we claim as new therein and desire to secure by Letters Patent:

1. An automatically-releasing friction-clutch having in combination a driving member, a driven member, a clutch-actuating lever mounted to rotate with one of said members, and a lever-actuating spool mounted to rotate with the other of said members, said spool being free to move axially into and out of engagement with said lever and adapted to be forced out of engagement therewith in an axial direction by a relative rotary movement of the lever and spool, as set forth.

2. An automatically-releasing friction-clutch having in combination a driving member, a driven member, a clutch-actuating lever mounted to rotate with one of said members, and a lever-actuating spool having a tapered or conical periphery and mounted to rotate with the other of said members, said spool being free to move into and out of engagement with said lever and adapted to be forced out of engagement therewith by the relative movement of the lever and spool, as set forth.

3. An automatically-releasing friction-clutch having in combination a driving member, a driven member, a clutch-actuating lever mounted to rotate with one of said members, an axially-movable lever-actuating spool mounted to rotate with the other of said members, and manually-operated means disengaged from said spool for moving said spool axially into engagement with said lever, said spool being free to move into and out of engagement with said lever and adapted to be forced axially out of engagement therewith by a relative rotary movement of the lever and spool, as set forth.

4. An automatically-releasing clutch having in combination a friction wheel or rim, an expansible frictional split ring, a ring-expanding lever mounted to rotate with the ring, and a lever-actuating spool mounted to rotate with said friction wheel or rim, said spool being free to move axially into and out of engagement with said lever and adapted to be forced axially out of engagement therewith by relative rotative movement of the lever and spool, as set forth.

5. An automatic friction-clutch having in combination a friction wheel or rim, an expansible friction-ring, a ring-expanding lever, and an actuating-spool free to move axially into and out of engagement with said lever and arranged to rotate with said friction wheel or rim, whereby the slip between the surfaces of said friction wheel or rim and said expansible ring will cause relative rotary movement between said spool and said lever, and said spool will be automatically moved axially away from said lever into inactive position, substantially as set forth.

6. In an automatic frictional clutch, the combination of a driving-shaft, a friction wheel or rim keyed to rotate with said shaft, an expansible friction-ring freely journaled upon said shaft within said wheel or rim, an actuating-lever mounted to rotate with said expansible ring, a lever-actuating spool splined upon said shaft to rotate therewith and free to move axially into and out of engagement with said lever and adapted to be forced axially out of engagement therewith by relative rotative movement of the lever and spool, and normally disengaged means for moving the said spool axially into engagement with said lever, substantially as set forth.

7. In an automatic frictional clutch, the combination of a shaft, a friction wheel or rim keyed to said shaft, an expansible friction-ring freely journaled upon said shaft within said wheel or rim, a ring-expanding lever mounted to rotate with said ring, a lever-actuating spool formed with an internal longitudinal spline-groove, a pin or stud secured to said shaft, an antifriction spline-roller freely journaled upon said pin or stud and engaging said spline-groove of the spool, and means for moving said spool into active position, substantially as set forth.

8. In an automatic frictional clutch, the combination of a supporting-shaft, a friction wheel or rim keyed to said shaft, an expansible friction-ring freely journaled upon said shaft within said wheel or rim, a gear also freely journaled upon said shaft, a drum connecting said gear with said expansible ring, a ring-expanding lever mounted to rotate with said ring, a spool splined upon said shaft to rotate with it and free to move into and out of engagement with said lever, and normally disengaged means for actuating said spool, substantially as set forth.

9. In an automatic frictional clutch, the combination of a supporting-shaft, a friction wheel or rim keyed to said shaft, an expansible split ring freely journaled upon said shaft within said wheel or rim, a gear also freely journaled upon said shaft, a drum connected with said gear and surrounding said wheel or rim, a circular plate or ring rigidly connected with said drum and said split ring for connecting said split ring and said gear, a ring-expanding lever mounted to rotate with said split ring, a spool splined upon said shaft to rotate with it and free to move into and out of engagement with said lever, and normally disengaged means for actuating said spool, substantially as set forth.

TALBOT C. DEXTER.
HENRY E. WOOD.

Witnesses:
J. GREEN,
WM. E. KNIGHT.